US012761657B2

(12) United States Patent
Moffett et al.

(10) Patent No.: US 12,761,657 B2
(45) Date of Patent: Oct. 13, 2026

(54) MOTION PLANNING USING ACCELERATION PROFILES

(71) Applicant: Tomahawk Robotics, Inc., Melbourne, FL (US)

(72) Inventors: Mark B. Moffett, Grant, FL (US); William S. Bowman, Melbourne, FL (US); Matthew D. Summer, Melbourne, FL (US); Timothy M. Williams, Indialantic, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 187 days.

(21) Appl. No.: 18/409,720

(22) Filed: Jan. 10, 2024

(65) Prior Publication Data

US 2025/0224728 A1 Jul. 10, 2025

(51) Int. Cl.

*G05D 1/229* (2024.01)
*G05D 1/245* (2024.01)
*G05D 109/20* (2024.01)
*G05D 111/50* (2024.01)

(52) U.S. Cl.

CPC ............. *G05D 1/229* (2024.01); *G05D 1/245* (2024.01); *G05D 2109/20* (2024.01); *G05D 2111/52* (2024.01)

(58) Field of Classification Search

CPC .... G05D 1/229; G05D 1/245; G05D 2109/20; G05D 2111/52
USPC ................................................................ 701/2
See application file for complete search history.

(56) References Cited

U.S. PATENT DOCUMENTS

2015/0317905 A1* 11/2015 Bourret ..................... G08G 5/74
701/4
2021/0325187 A1* 10/2021 Choudhury ............ G01C 21/30
2022/0055746 A1* 2/2022 Zhang .................. G05D 1/0011
2022/0097725 A1* 3/2022 Corte ..................... G06V 20/58
(Continued)

FOREIGN PATENT DOCUMENTS

CN 113296526 A 8/2021
KR 100892094 B1 4/2009

OTHER PUBLICATIONS

International Search Report and Written Opinion issued Apr. 18, 2025, in International Application No. PCT/US2024/061988 (10 pages).

*Primary Examiner* — Mahmoud S Ismail

(74) *Attorney, Agent, or Firm* — Ashurst Perkins Coie US LLP

(57) ABSTRACT

Methods and systems are described herein for navigating a vehicle. A target location may be received, and based on the target location and vehicle parameters, an acceleration profile for the vehicle may be generated. The acceleration profile may include a first duration for accelerating the vehicle and a second duration for not accelerating the vehicle. When the acceleration profile is generated, a trajectory profile for travelling to the target location may be generated using the acceleration profile. The trajectory profile may include multiple instances of the acceleration profile. When the trajectory profile is being executed, a distance travelled by the vehicle after each instance of the acceleration profile is executed may be calculated. Based on the distance travelled after each instance of the acceleration profile is executed, an instance of when the target location is reached may be determined.

20 Claims, 7 Drawing Sheets

100

(56) References Cited

U.S. PATENT DOCUMENTS

| | | | | |
|---|---|---|---|---|
| 2022/0363248 | A1* | 11/2022 | Shalev-Shwartz ... | G06V 20/584 |
| 2023/0322226 | A1* | 10/2023 | Sarlashkar ............ | B60W 40/04 701/23 |
| 2024/0278782 | A1* | 8/2024 | Kelkar ................ | B60W 60/001 |
| 2025/0162581 | A1* | 5/2025 | Brunner .................. | G01S 17/93 |
| 2025/0224253 | A1* | 7/2025 | Wimpfheimer .... | G01C 21/3822 |

* cited by examiner

| Acceleration Profile ID (203) | Engage Time (206) | Disengage Time (209) | Max_Thrust (212) | Vehicle Type (215) |
|---|---|---|---|---|
| Acc_121 | 6 seconds | 1 Second | <Max_Thurst1> | <Type1> |
| Acc_122 | 3 seconds | 3 Seconds | <Max_Thurst2> | <Type2> |
| Acc_123 | 6 seconds | 3 Seconds | <Max_Thurst3> | <Type3> |

FIG. 2

303 306 309 315

| Acceleration Profile ID | Power | Direction | Instances |
|---|---|---|---|
| Acc_121 | 100% | W 60 N | 100 |
| Acc_122 | 50% | W 30 N | 78 |
| Acc_121 | 75% | E 30 N | 24 |

FIG. 3

400

403 406

| Acceleration Instance ID | Adjustment |
|---|---|
| Acc_Instance_22 | <adjustment vector> |
| Acc_Instance_23 | <adjustment vector> |
| Acc_Instance_24 | <adjustment vector> |

FIG. 4

MOTION PLANNING USING ACCELERATION PROFILES

BACKGROUND

Stable and reliable robotic systems are becoming increasingly common, which has contributed to the recent advancement and proliferation of uncrewed system technologies. Generally, uncrewed systems (e.g., aerial uncrewed vehicles) are able to navigate using operator commands and/or use a global positioning system (GPS) to autonomously navigate to target locations. An uncrewed system may be designed to hold programming that enables the uncrewed system to receive a GPS signal, determine its location based on the GPS signal, and then navigate to a target location based on the combination of its location and the target location. However, in some instances, GPS navigation may not be available. For example, satellite signals may be lost due to interference, spoofing, and/or other issues. Accordingly, there may be areas where GPS navigation is denied. In these instances, an uncrewed vehicle may be forced to use onboard sensors (e.g., an accelerometer, gyroscope, and/or other sensors) to navigate to and from target locations. However, onboard sensors may not be able to accurately measure vehicle velocity and, as a result, a vehicle may not be able to accurately navigate without GPS signals.

SUMMARY

Therefore, methods and systems are described herein for navigating uncrewed vehicles using onboard sensors. For example, an uncrewed vehicle may have an installed accelerometer and/or a gyroscope for measuring acceleration changes and direction changes. A navigation system may use those onboard sensors to perform the operations described herein. The navigation system may reside on an uncrewed vehicle or, at least partially, at a central location (e.g., a command-and-control point) and/or on a computing device being used by an operator. For example, a command-and-control point may be in a vehicle equipped with one or more computing devices, a datacenter that houses computing devices, or in another suitable environment. That is, the operations described below may be performed onboard the uncrewed vehicle or at another location (e.g., operator device or command-and-control center).

In some embodiments, the navigation system may receive a target location for an uncrewed vehicle and navigate the vehicle based on the target location and vehicle parameters. For example, the target location may be a set of coordinates (e.g., longitude, latitude, and/or altitude) for the vehicle to travel. The target location may be a location for scouting. For example, an uncrewed vehicle may be tasked with flying to a particular location, recording images of the location and then flying back.

The navigation system may then generate an acceleration profile for travelling for the location. In particular, the navigation system may generate, based on vehicle parameters associated with the uncrewed vehicle, an acceleration profile for the uncrewed vehicle. The acceleration profile may include a first duration for accelerating the uncrewed vehicle and a second duration for refraining from accelerating the uncrewed vehicle. For example, the acceleration profile may include a first time of six seconds and a second time of two seconds. That is, the acceleration profile may indicate that the vehicle should accelerate (e.g., engage motors) for six seconds and then stop accelerating (e.g., disengage motors) for two seconds. In some embodiments, the acceleration profile may include a motor speed (e.g., full speed, half speed, etc.) within the acceleration profile.

As mentioned above, the acceleration profile may be generated based on vehicle parameters such as vehicle type, motor type or types, sensor type or types, and/or other suitable parameters. For example, a particular vehicle may include a motor that may be able to spin at full throttle for a limited amount of time (e.g., because it may overheat). Accordingly, the navigation system may generate a profile where the acceleration duration will be less than that amount of time. Furthermore, the accelerometer on board the vehicle may not be sensitive enough to detect acceleration less than a particular magnitude, accordingly, the navigation system may set the motors to spin in such a way that a detectable acceleration is reached quickly so that there is minimal inaccuracy.

When the navigation system generates the acceleration profile, the navigation system may generate a trajectory profile (e.g., a path) for travelling to the target location. In particular, the navigation system may generate, based on the target location and the acceleration profile, a trajectory profile for travelling to the target location. The trajectory profile may include a plurality of instances of the acceleration profile. For example, the navigation system may estimate (e.g., based on the acceleration and times within the acceleration profile) the distance that the vehicle travels during every execution of the acceleration profile. Based on those factors, the navigation system may determine how many instances of the acceleration profile is needed to reach the target location. In some embodiments, the trajectory profile may include a direction of travel. For example, if non-linear travel is required, a particular acceleration profile instance within the trajectory profile may accelerate the vehicle in a direction that is different from the direction of the last acceleration profile instance.

In some embodiments, the navigation system may monitor the uncrewed vehicle while the vehicle is executing the trajectory profile. In particular, the navigation system may calculate, while executing the trajectory profile after each instance of the acceleration profile, a distance travelled by the uncrewed vehicle. For example, the navigation system may use onboard sensors to record the acceleration/deceleration of the uncrewed vehicle and calculate (e.g., using double integration) a distance travelled during the acceleration phase and the deceleration phase of each instance of the acceleration profile. Based on these calculations, the navigation system may adjust the trajectory profile. For example, if a vehicle is an aerial vehicle and there are windy conditions, the aerial vehicle may be travelling faster, slower, and/or in another direction during the acceleration and deceleration phases of each instance of the acceleration profile. The monitoring of each phase may enable adjustments to the trajectory profile (e.g., adding/removing instance of the acceleration profile).

When all the instances of the acceleration profile have been executed or when the calculations otherwise indicate that the target location has been reached, the navigation system may generate a task completed indication. In particular, based on determining that the distance travelled matches a target distance to the target location, the navigation system may generate an indication that the target location has been reached. For example, when the target location is reached and the indication is generated, the navigation system may indicate to a camera system on board to commence recording images of the location. In some embodiments, the navigation system may transmit the indication to the operator and the operator may initiate another task. For example, the operator may command the vehicle to record images and/or return home.

In some embodiments, acceleration profiles may differ for different types of vehicles. For example, if the navigation system is hosted on an aerial vehicle, the navigation system may take into account, when generating an acceleration profile or a trajectory profile, the altitude of the vehicle. That is, the navigation system may generate an acceleration profile and/or a trajectory profile to ensure that the aerial vehicle does not contact the terrain (e.g., does not crash into the ground, does not hit any trees, houses, etc.). In another example, if the vehicle is an uncrewed land vehicle, the navigation system may take into account terrain variations when generating an acceleration profile and/or trajectory profile. For example, if there are unpassable mountains or lakes, the navigation system may generate the acceleration profile and/or trajectory profile to move around those obstacles.

As discussed above, acceleration profiles in combination with trajectory profiles may be used for trajectory planning. However, acceleration profiles may also be used for varying trajectories (e.g., of uncrewed vehicles). For example, uncrewed vehicles may have different mission profiles and objectives. One mission objective may be to return home without revealing a position that the vehicle is returning to. Accordingly, it may be advantageous to vary the vehicle's path. In another example, a mission profile may include a stealth run that is designed to disguise a point of interest for the uncrewed vehicle. For example, the mission of an uncrewed aerial vehicle may be to fly to a location and record images of that location. However, a mission profile may include that the objective should not be obvious. Thus, the trajectory profile for the uncrewed aerial vehicle may include a number of places where the aerial vehicle may fly to, pause, and then fly to another location. The aerial vehicle may record images of only one location, but it would not be clear which location.

Accordingly, methods and systems are described herein for navigating vehicles using acceleration profiles and trajectory profiles. In some embodiments, the navigation system (e.g., at an uncrewed vehicle) may receive a target location and a target mode. The target mode may indicate a type of activity for the uncrewed vehicle. For example, an uncrewed aerial vehicle may receive a set of coordinates (e.g., latitude, longitude and/or altitude) together with a command to fly to that location and record images of that location. In addition, the uncrewed aerial vehicle may receive a target mode (e.g., stealth mode) indicating to the uncrewed aerial vehicle that the true target location should be obscured by flying to one or more other locations and idling or performing flybys at those locations. Other modes may include obscure home location (e.g., when the vehicle is returning home) and vary speeds/directions to, for example, confuse other operators and equipment as to the true heading of the vehicle. Another target mode may include a "quiet mode" indicating that the vehicle should be travelling as silently as possible (e.g., such that the motors are making minimal noise).

The navigation system may select one or more acceleration profiles for the received task. Thus, the navigation system may access a plurality of acceleration profiles associated with the uncrewed vehicle. Each acceleration profile may include a corresponding first duration for accelerating the uncrewed vehicle and a corresponding second duration for not accelerating the uncrewed vehicle. As discussed above, the acceleration profile may include a first time of six seconds and a second time of two seconds. That is, the acceleration profile may indicate that the vehicle should accelerate (e.g., engage motors) for six seconds and then stop accelerating (e.g., disengage motors) for two seconds. Another acceleration profile may indicate that the vehicle should accelerate for ten seconds and then stop accelerating for three seconds. In some embodiments, each acceleration profile may include a motor speed (e.g., full speed, half speed, etc.) and/or a direction of movement.

The navigation system may then generate a trajectory profile for travelling to the location. In particular, the navigation system may generate, based on the target location and the target mode, a trajectory profile for travelling to the target location. The trajectory profile may include a plurality of instances of one or more acceleration profiles. For example, the navigation system may select a single acceleration profile for navigating to the target location. In some embodiments, the navigation system may select multiple acceleration profiles for navigating to the target location. In some embodiments, if the target mode is "obscure target location", the navigation system may generate a trajectory profile that includes other locations in addition to the target location and also select one or more acceleration profiles to travel to these locations. In some embodiments, the navigation system may select different acceleration profiles for travelling to different locations.

When the trajectory profile has been generated, the navigation system may cause the trajectory profile to be executed by the uncrewed vehicle. In some embodiments, the trajectory profile may be generated on a device different from the uncrewed vehicle. For example, the trajectory profile may be generated on the vehicle control (e.g., a vehicle controller used by an operator to control the vehicle). In some embodiments, the trajectory profile may be generated on the vehicle itself and executed on the vehicle. When the trajectory profile is being executed the navigation system may determine locations of the uncrewed vehicle (e.g., as the vehicle reaches various waypoints or locations).

In some embodiments, the navigation system may track execution of the trajectory profile. In particular, the navigation system may determine, while executing the trajectory profile after each instance of the one or more acceleration profiles, a corresponding vehicle location of the uncrewed vehicle. As discussed above, the navigation system may track progress by using onboard instruments (e.g., an accelerometer and/or gyroscope) to determine distance travelled after execution of each instance of the acceleration profile. In some embodiments, the navigation system may determine whether the distance travelled matches an estimated distance to determine whether the vehicle is travelling according to the trajectory profile.

In some instances, the vehicle may not be travelling according to the trajectory profile. For example, the vehicle may be an uncrewed aerial vehicle and that uncrewed aerial vehicle may be affected by wind conditions, and thus, the vehicle may be travelling further (e.g., depending on the wind), in a different direction, or not far enough. Accordingly, the navigation system may adjust the trajectory profile based on the corresponding vehicle location. For example, the navigation system may add or remove one or more instances of the one or more acceleration profiles selected for the trajectory profile.

As the vehicle is moving according to the trajectory profile, the navigation system may track total distance travelled, direction, and other parameters. Thus, in some embodiments, based on determining that the plurality of instances of the one or more acceleration profiles have been executed, the navigation system may terminate execution of the trajectory profile. In some embodiments, the navigation system may terminate execution of the trajectory profile when the target location has been reached even if the full trajectory profile has not been executed. Furthermore, if the navigation system continues to adjust the trajectory profile as the vehicle is moving, the trajectory profile may be fully executed as the vehicle reaches the target location.

As discussed above, various target modes are contemplated by this disclosure. For example, "obscure pathing" target mode may instruct the navigation system to generate waypoints to the target (e.g., waypoints that are not a straight line to the target location) to obscure the path to the target location. The navigation system may use one or more acceleration profiles to construct a path through the way points to the target location. In another example, "obscure target location" target mode may instruct the navigation system to generate waypoints that are near the target location as to confuse an observer or an electronic system as to what the target is and what the objective at the target is. Another example may be a "minimum noise" target mode that instructs the navigation system to use acceleration profiles that cause the vehicle to produce minimum noise when travelling. Other target modes are contemplated by this disclosure.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a data structure that may store acceleration profiles, in accordance with one or more embodiments of this disclosure.

FIG. 3 illustrates an excerpt of a trajectory profile, in accordance with one or more embodiments of this disclosure.

FIG. 4 illustrates an excerpt of a data structure that may store a trajectory profile and trajectory profile adjustments, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming. Furthermore, it should be noted that although the embodiments described in this disclosure are described with respect to uncrewed vehicles, these embodiments may also be used for crewed vehicles or vehicles in general.

Figure 1:
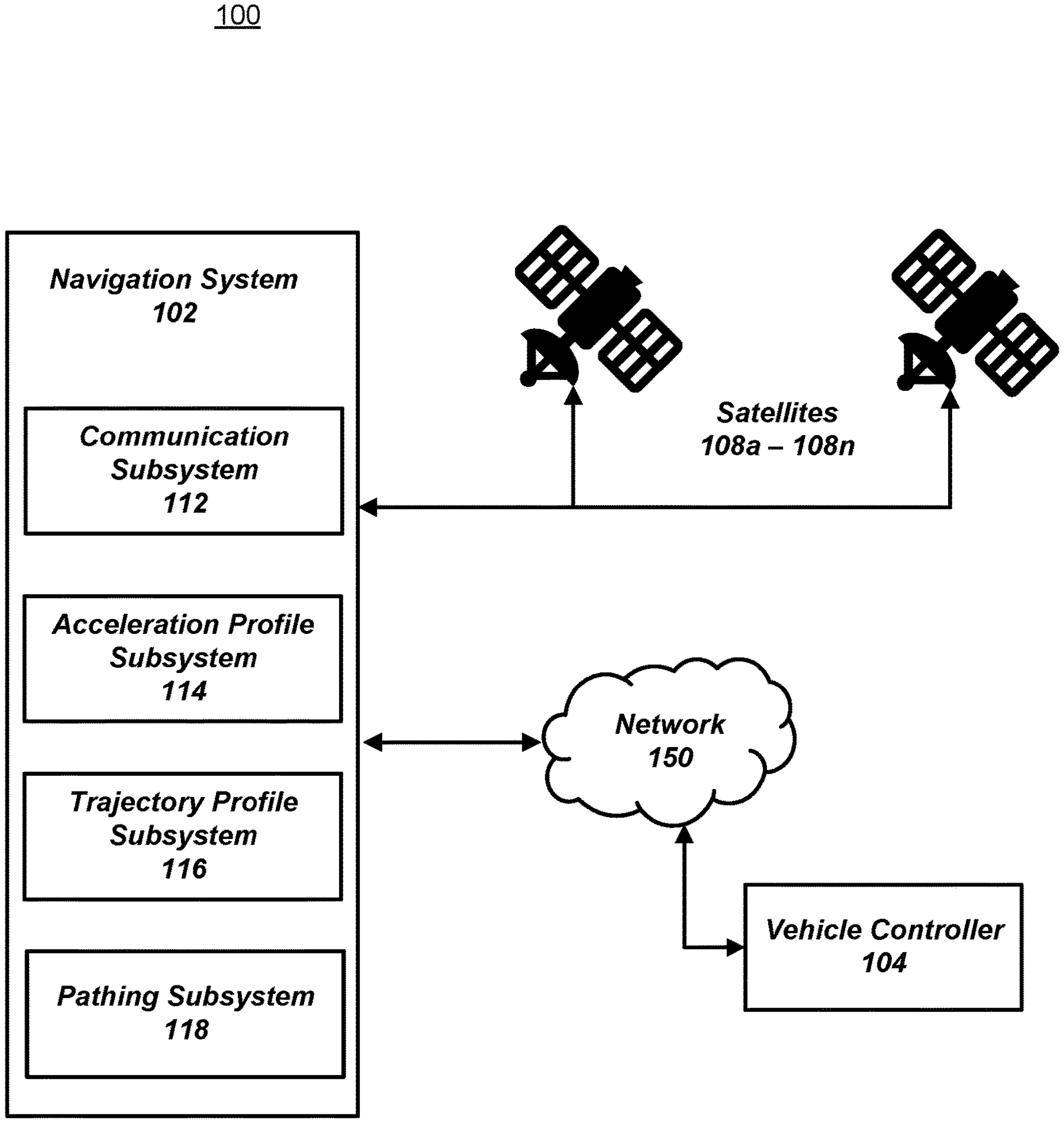
FIG. 1 shows an illustrative system for navigating vehicles using acceleration profiles, in accordance with one or more embodiments of this disclosure.

FIG. 1 is an example of environment 100 for navigating vehicles using acceleration profiles. Environment 100 includes navigation system 102, vehicle controller 104, and satellites **108*a*-108*n*. Navigation system 102 may execute instructions for navigating vehicles using acceleration profiles. Navigation system 102 may include software, hardware, or a combination of the two. In some embodiments, although shown separately, portions of navigation system 102 may reside on vehicle controller 104**.

Vehicle controller 104 may be used by an operator to control the uncrewed vehicle. For example, vehicle controller 104 may include a radio or another wireless device for communicating with the uncrewed vehicle. The vehicle controller may be able to send commands to the uncrewed vehicle for maneuvering the uncrewed vehicle and executing other commands. Vehicle controller 104 may include software, hardware, or a combination of the two. Network 150 may be a wireless network such as a radio network, a Wi-Fi network, and/or another suitable network. Vehicle controller 104 and navigation system 102 may communicate over network 150 (e.g., via a radio).

Vehicle Navigation Using an Acceleration Profile

Navigation system 102 may receive a target location for an uncrewed vehicle. In some embodiments, navigation system 102 may be hosted on a computing device onboard the uncrewed vehicle and may have control of vehicle operations. Accordingly, navigation system 102 may receive the target location from vehicle controller 104 or from another computing device at the uncrewed vehicle. The target location may be received, for example, over a radio network (e.g., network 150). Navigation system 102 may receive the target location using communication subsystem 112. Communication subsystem 112 may include software components, hardware components, or a combination of both. For example, communication subsystem 112 may include a network device (e.g., a radio or another suitable network device) that is coupled with software to operate the radio.

In some embodiments, navigation system 102 may be located, at least partially, on a computing device that is not onboard an uncrewed vehicle. For example, a portion of navigation system 102 may be located on a computing device located within a command-and-control center or on a vehicle controller. In these instances, the target location may be received from an operator as an input into vehicle controller 104 or from an operator at a terminal within the command-and-control center. Communication subsystem 112 may pass the target location or a pointer to the target location in memory to acceleration profile subsystem 114.

Acceleration profile subsystem 114 may include software components, hardware components, or a combination of both. For example, acceleration profile subsystem 114 may include instructions to perform operations discussed below using one or more processors and store results in memory.

In some embodiments, acceleration profile subsystem 114 may generate an acceleration profile for the uncrewed vehicle. In particular, acceleration profile subsystem 114 may generate, based on vehicle parameters associated with the uncrewed vehicle, an acceleration profile for the uncrewed vehicle. The acceleration profile may include a first duration for accelerating the uncrewed vehicle and a second duration for refraining from accelerating the uncrewed vehicle. In some embodiments, the vehicle parameters may include a vehicle type and/or acceleration sensor type. For example, acceleration profile subsystem 114 may generate different acceleration profiles for aerial vehicles, land vehicles, water vehicles, and/or amphibious vehicles.

In some embodiments, acceleration profile subsystem 114 may analyze vehicle parameters when generating the acceleration profile. In particular, acceleration profile subsystem 114 may detect a vehicle type associated with the uncrewed vehicle. For example, acceleration profile subsystem 114 may determine whether the vehicle is an aerial vehicle, a land vehicle, a water vehicle, or an amphibious vehicle. In some embodiments, acceleration profile subsystem 114 may determine the type of propulsion that the vehicle uses. For example, if the uncrewed vehicle is a quad copter, acceleration profile subsystem 114 may select a particular duration for spinning the motors of the quad copter and another particular duration for keeping the motors stopped as part of the acceleration profile. In another example, if the uncrewed vehicle is a land vehicle (e.g., a rolling vehicle), acceleration profile subsystem 114 may select another duration for accelerating the vehicle and yet another duration for not accelerating the vehicle. In yet another example, acceleration profile subsystem 114 may detect quadruped vehicles and select appropriate durations for accelerated movement.

In some embodiments, acceleration profile subsystem 114 may determine, based on the vehicle type, a maximum thrust associated with the uncrewed vehicle. For example, based on the maximum thrust, acceleration profile subsystem 114 may determine maximum acceleration for the vehicle and how long the vehicle is able to operate at maximum thrust (e.g., due to power restrictions or motor cooling restrictions). For example, acceleration profile subsystem 114 may access a data structure that stores multiple possible acceleration profiles. Acceleration profile subsystem 114 may search the data structure for a profile that matches the vehicle type, maximum thrust, and/or other vehicle parameters. Based on those one or more matching parameters, acceleration profile subsystem 114 may identify a matching entry in the data structure.

Acceleration profile subsystem 114 may then determine the first duration (i.e., the duration for keeping the engines running) based on the maximum thrust associated with the uncrewed vehicle. In some embodiments, acceleration profile subsystem 114 may determine an entry with an acceleration value below the maximum thrust. For example, an uncrewed aerial vehicle may determine a minimum value available that may be detected by a sensor type built into that uncrewed aerial vehicle.

In some embodiments, acceleration profile subsystem 114 may determine acceleration profiles based on thrust to weight ratio of the uncrewed vehicle itself. For example, if the uncrewed vehicle is a quad copter, given the mass of the quad copter and the maximum thrust of the rotors, the quad copter may accelerate at that maximum thrust for twenty seconds before the quad copter is only able to maintain a particular speed with the acceleration falling to zero. Accordingly, a quad copter with that configuration would be unable to have an acceleration profile that calls for accelerating longer than 20 seconds. Thus, acceleration profile subsystem 114 may determine for this type of uncrewed vehicle that the maximum acceleration time at maximum thrust may be twenty seconds. Other acceleration profiles for this uncrewed vehicle may include accelerating for fifteen seconds at seventy five percent of maximum thrust, accelerating for ten seconds at fifty percent of maximum thrust, etc. These profiles may be predetermined based on the type of uncrewed vehicle and/or component types, mass of the vehicle, etc. In some embodiments, this information may be determined by experimentation. For example, when a new uncrewed vehicle is acquired, a part of the setup routine may be performing tests for an amount of time that an accelerometer may detect acceleration while the vehicle is at full thrust. While the test is ongoing other measurements may be taken (e.g., speeds, altitude, distance travelled, etc.). Acceleration profile subsystem 114 may generate different acceleration profiles for different thrust values and store those in a data structure associated with the uncrewed vehicle.

In some embodiments, acceleration profile subsystem 114 may use acceleration sensor types to determine the acceleration profile. In particular, acceleration profile subsystem 114 may detect an acceleration sensor type associated with a sensor onboard the uncrewed vehicle that measures acceleration of the uncrewed vehicle. For example, the sensor may include an application programming interface (API) that enables acceleration profile subsystem 114 to request sensor information (e.g., sensor model, sensor type, etc.) for the acceleration sensor on board. In some embodiments, sensor type information may be stored in memory of the uncrewed vehicle. Based on the sensor type, acceleration profile subsystem 114 may determine a minimum detectable acceleration. For example, acceleration profile subsystem 114 may query the acceleration sensor (e.g., via an API) to determine a minimum detectable acceleration by the sensor. In some embodiments, acceleration profile subsystem 114 may have access to the minimum acceleration data that is stored in memory (e.g., in volatile or non-volatile memory on board the uncrewed vehicle).

As discussed above, each acceleration profile may be dependent on sensor readings from onboard electronics. These onboard electronics may contain a plurality of sensors including one or more accelerometers, gyroscopes, magnetometers, altimeters, and/or other localized sensors that may not require receiving or sending information in order to operate. Given that an aerial vehicle is able to move in three dimensions as well as rotate in three dimensions, the sensor data generating the acceleration profiles may be required to account for motions acting on a six degree of freedom system. In some embodiments, simple one-dimensional accelerations may not account for an adequate profile as a feedback loop. The complexity of a six degree of freedom acceleration profile may require a combination of dimensions through the use of averaged magnitudes, Kalman filters or other methodologies. For example, acceleration profiles may be used for one dimensional acceleration such as a train accelerating on a linear track, two dimensional accelerations such as a car that turns on a flat plane, or three-dimensional accelerations such as a quadcopter that translates and rotates in all directions, each adding another layer of complexity. Any system above one dimension may require meshing of sensor readouts to account for multiple degrees of freedom to determine the difference between an acceleration and a tilt and how that translates to an accurate acceleration profile that may be used to dead reckon (e.g., determine location based on distance and direction travelled from a previously known point) and self-localize in GPS denied locations.

In some embodiments, the accelerometer alone may not be able to determine the difference between an acceleration and a tilt (e.g., for a quadcopter). However, with an addition of a gyroscope, magnetometer, and altimeter, a "true" orientation may be achieved. Combining readings from these instruments into dataset enables generation of a single goal acceleration profile, which the flight controller may follow. Combining the sensor data (sensor fusion) to determine the specifics may be done in multiple ways. For example, an averaged magnitude coupled with a trained data set may allow the system to determine the difference between correct orientations and incorrect orientations. Furthermore, a Kalman filter may take, as input, a running average of multiple sensor inputs and may create "states" of the system that run continuously for estimating the "state" of the system. This process may be used by a large number of various sensors and may be adapted to a large number of systems. For aerial vehicles, the process may be used for estimating the state of the vehicle: position, velocity, acceleration, orientation, heading, etc. One input into a Kalman filter, in flight controllers, may be GPS data indicating, for example, a home or a start position. Thus, for any future positions, estimates may be made with GPS coordinates being a starting point. A flight controller with a Kalman filter, or averaged magnitudes, or using other cross dimensional comparisons may utilize an acceleration profile to determine its position without the use of GPS, but may require training the flight controller using GPS or creating a data set of "known behaviors" that the flight controller may reference when moving without GPS as a constant position update. The flight controller may be required to reference something for an update, which may be the acceleration profile table described above.

When acceleration profile subsystem 114 determines the minimum detectable acceleration, acceleration profile subsystem 114 may select an acceleration profile associated with a detectable acceleration equal to or greater than the minimum detectable acceleration. In particular, acceleration profile subsystem 114 may determine the acceleration profile based on the minimum detectable acceleration. The determination may require that an acceleration value be set above the minimum detectable acceleration. Acceleration profile subsystem 114 may determine the acceleration value based on the different thrust values associated with the uncrewed vehicle. For example, at maximum thrust, a particular acceleration may be achieved (e.g., based on test results), while another acceleration may be achieved at seventy five percent thrust. Thus, acceleration profile subsystem 114 may determine which thrust level or minimum thrust level is required for detection.

In some embodiments, acceleration profile subsystem 114 may select an acceleration profile based on FIG. 2. FIG. 2 illustrates an excerpt of a data structure 200 that may store acceleration profiles. Thus, acceleration profile subsystem 114 may select an acceleration profile from different acceleration profiles available in the data structure. Data structure 200 may store acceleration profiles such that field 203 may store an identifier associated with each acceleration profile. The identifier may be, for example, an alphanumeric string, a number, or another suitable identifier. Field 206 may store an engage time representing the amount of time that the uncrewed vehicle is to be accelerated. That is, field 206 may store an amount of time a motor is to be engaged such that the uncrewed vehicle is to accelerate. Field 209 may store a disengage time. For example, field 209 may store a time value for how long the motor is going to be disengaged. That is, field 209 may store an amount of time a motor is to be disengaged such that the uncrewed vehicle is to decelerate. Field 212 may store a maximum thrust value for the associated acceleration profile and field 215 may store a vehicle type. In some embodiments, in addition to or instead of field 215 may store an acceleration sensor type and/or other information. In some embodiments, acceleration profile subsystem 114 may determine an acceleration sensor type based on the vehicle type or a vehicle identifier. Acceleration profile subsystem 114 may determine the vehicle identifier by accessing the vehicle data through, for example, an API.

In some embodiments, each acceleration profile may include instructions for an uncrewed vehicle in addition to or instead of the timing information. In particular, an acceleration profile may include a first instruction to engage one or more motors associated with the uncrewed vehicle and an amount of power to be applied to the one or more motors. For example, the uncrewed vehicle may be an aerial uncrewed vehicle such as a quad copter. In this instance, the acceleration profile may indicate that the quad copter is to turn its motors on (e.g., max throttle) for three seconds. Another command may indicate that the quad copter is to turn its motors on for six seconds at half throttle. The acceleration profile may also include a second instruction to disengage the one or more motors after a time period for engaging the one or more motors has passed. For example, the second instruction may indicate that the motors should be turned off for a particular period of time so that the vehicle is able to decelerate. Once that time has expired for the motors to be turned off, acceleration profile subsystem 114 may read the first instruction to turn the motors on again.

In some embodiments, acceleration profile subsystem 114 may determine that the uncrewed vehicle is an aerial vehicle and account for required altitude (e.g., so that the aerial vehicle does not contact the ground). In particular, acceleration profile subsystem 114 may determine, based on a vehicle type of the uncrewed vehicle, that the uncrewed vehicle is an aerial vehicle. For example, the vehicle type may be a quad copter. Accordingly, acceleration profile subsystem 114 may determine that the vehicle is an aerial vehicle. Acceleration profile subsystem 114 may make this determination based on accessing the data from the vehicle's memory. Based on determining that the uncrewed vehicle is the aerial vehicle, acceleration profile subsystem 114 may adjust the acceleration profile to prevent the uncrewed vehicle from contacting terrain. For example, acceleration profile subsystem 114 may not select an acceleration profile that requires decelerating at such a rate that the deceleration may cause the aerial vehicle to fall and hit the ground.

When the acceleration profile has been selected, acceleration profile subsystem 114 may pass the acceleration profile or a pointer in memory to the acceleration profile to trajectory profile subsystem 116. Trajectory profile subsystem 116 may include software components, hardware components, or a combination of both. For example, trajectory profile subsystem 116 may include software components that access data in memory and/or storage and may use one or more processors to perform its operations. Trajectory profile subsystem 116 may generate, based on the target location and the acceleration profile, a trajectory profile for travelling to the target location. The trajectory profile may include a plurality of instances of the acceleration profile. For example, trajectory profile subsystem 116 may determine, based on the target location, a target distance to the target location. Furthermore, trajectory profile subsystem 116 may determine a distance that the uncrewed vehicle is to travel for every execution of an acceleration profile. Based on these two distances, trajectory profile subsystem 116 may determine how many instances of the acceleration profile are needed to travel to the target location. For example, a trajectory profile may include an acceleration profile identifier, a direction of travel and the amount of thrust for each acceleration.

In some embodiments, the trajectory profile may include multiple acceleration profiles. For example, it may be desirable for the vehicle to not travel in a straight line. In particular, a ground vehicle may not be able to travel in a straight line because of land or water barriers. Accordingly, the associated trajectory profile may need multiple acceleration profiles and/or directions. Furthermore, it may be desirable to disguise a path of an aerial vehicle. Thus, multiple acceleration profiles and/or directions of travel may be desired. FIG. 3 illustrates an excerpt of a trajectory profile 300. Field 303 may store an identifier of the acceleration profile. The excerpt of trajectory profile 300 indicates that there are three different directions of travel. Field 306 indicates the power (e.g., thrust) to be applied when acceleration is being performed (e.g., when the motors are being spun). Field 309 indicates a direction of travel desired. In some embodiments, FIG. 3 may include field 315 that stores a number of instances of each acceleration profiles to be executed. However, in certain embodiments the number of instances of each acceleration profile is not used. Instead, during flight, navigation system 102 determines whether another instance of the acceleration profile is needed to be executed based on distance to target location.

Once the trajectory profile is generated, navigation system 102 may execute the trajectory profile to travel to the target location. In some embodiments, trajectory profile subsystem 116 may account for three-dimensional acceleration and deceleration in, for example, aerial vehicles. For example, a quad copter may accelerate vertically in addition to accelerating horizontally. Accordingly, trajectory profile subsystem 116 may account for that when generating the trajectory profile. Furthermore, trajectory profile subsystem 116 may account for the angle of acceleration for aerial vehicles. For example, the angle of acceleration may be at thirty degrees, at sixty degrees, or at another suitable angle. Furthermore, trajectory profile subsystem 116 may include different measurements at different rotations per minute of propeller vehicles when generating trajectory profiles.

In some embodiments, trajectory profile subsystem 116 may pass the trajectory profile or a pointer in memory to the trajectory profile to pathing subsystem 118. Pathing subsystem 118 may include software components, hardware components, or a combination of both. For example, pathing subsystem 118 may include software components that access data in memory and/or storage and may use one or more processors to guide the uncrewed vehicle. In some embodiments, pathing subsystem 118 may calculate, while executing the trajectory profile after each instance of the acceleration profile, a distance travelled by the uncrewed vehicle. For example, pathing subsystem 118 may use an onboard device to calculate the distance travelled by the vehicle after the first instance of the acceleration profile has been executed, then again after the second distance, and so on. In some embodiments, pathing subsystem 118 may use double integration of acceleration over time to determine a distance travelled after each instance of the acceleration has been executed.

In some embodiments, pathing subsystem 118 may account for directional changes when executing the trajectory profile and calculating distance travelled. For example, with aerial vehicles, wind may be a factor when an uncrewed vehicle is traveling. With watercraft and underwater vehicles, currents may affect travel. Accordingly, pathing subsystem 118 may determine a direction associated with a first acceleration. The first acceleration may be associated with a first instance of the plurality of instances of the acceleration profile. For example, the trajectory profile may require accelerating and decelerating in a particular direction. However, because of wind conditions, acceleration and or deceleration affected the direction of the vehicle during execution of a previous acceleration profile such that the uncrewed vehicle's direction of movement was ten degrees off. Accordingly, pathing subsystem 118 may modify the execution of the next acceleration profile to adjust for the change. Thus, pathing subsystem 118 may adjust a second instance of the acceleration profile based on the direction associated with the first acceleration.

In some embodiments, pathing subsystem 118 may adjust a trajectory profile based on distance travelled after each instance of the acceleration profile being executed. In particular, pathing subsystem 118 may determine a first distance travelled after a first acceleration. The first acceleration may be associated with a first instance of the plurality of instances of the acceleration profile. For example, as pathing subsystem 118 is executing the trajectory profile, pathing subsystem 118 may determine a distance the uncrewed vehicle should have travelled after execution of the particular instance of the acceleration profile. That distance may be stored with the trajectory profile. Pathing subsystem 118 may compare the distance that the uncrewed vehicle should have travelled with the distance the uncrewed vehicle actually travelled (e.g., as calculated by double-integrating acceleration over time) and determine whether a trajectory profile adjustment is needed. For example, pathing subsystem 118 may determine that an additional instance of acceleration profile should be added to the trajectory profile because an uncrewed aerial vehicle is travelling against the wind and each instance of acceleration profile does not get the uncrewed vehicle where the vehicle should be at that instance.

Accordingly, pathing subsystem 118 may adjust the trajectory profile based on the first distance travelled after the first acceleration. For example, pathing subsystem 118 may recalculate the number of instances of the acceleration profile needed after each execution and adjust the trajectory profile accordingly. In some embodiments, pathing subsystem 118 may perform this adjustment in combination with adjusted direction. For example, an aerial vehicle may be travelling such that the wind has affected not only the magnitude of distance travelled, but also the direction as detected by onboard instruments. Accordingly, pathing subsystem 118 may adjust the direction of the next instance of the acceleration profile to be executed and may add another instance of the acceleration profile to the trajectory profile.

FIG. 4 illustrates an excerpt of a data structure 400 that may store a trajectory profile and trajectory profile adjustments. Field 403 may include an instance identifier for each instance of the acceleration profile within the trajectory profile and field 406 may store an adjustment vector for the particular instance of acceleration profile. The adjustment vector may be a combination direction and duration. In some embodiments, pathing subsystem 118 may add a new acceleration profile to the trajectory profile to adjust the trajectory profile. For example, field 406 may store an additional acceleration profile, which may be different from the acceleration profile that was originally selected by navigation system 102. In some embodiments, the additional acceleration profile may be determined with a direction of travel.

Special Modes of Operation Using Multiple Acceleration Profiles

In some embodiments, one or more acceleration profiles may be combined into a trajectory profile to navigate an uncrewed vehicle based on mission parameters. For example, an uncrewed aerial vehicle may have been assigned a mission to fly to a target location and record images and/or video of that target location. However, a parameter of the mission may indicate that the target location should not be easily identifiable to an observer. Accordingly, a navigation system may generate a trajectory profile that navigates to five different locations so as to hide a true target location.

In some embodiments, navigation system 102 may perform the following operations for navigating an uncrewed vehicle based on mission parameters. Navigation system 102 may receive (e.g., via communication subsystem 112), for an uncrewed vehicle, a target location and a target mode. The target mode may indicate a type of activity for the uncrewed vehicle. For example, mission parameters may include travelling (e.g., flying) to a target location and obscuring the return path of the uncrewed aerial vehicle. To conform with that mission parameter, navigation system 102 may generate a trajectory profile that does not include the uncrewed aerial vehicle travelling in a straight line to point of origin after a mission is completed.

Based on the target location and the target mode received, navigation system 102 may select or generate an acceleration profile to be used for navigation. In particular, navigation system 102 (e.g., using trajectory profile subsystem 116) may access a plurality of acceleration profiles associated with the uncrewed vehicle. Each acceleration profile of the plurality of acceleration profiles may include a corresponding first duration for accelerating the uncrewed vehicle and a corresponding second duration for not accelerating the uncrewed vehicle. The acceleration profiles accessed may be acceleration profiles as shown in FIG. 2. The acceleration profiles may be stored on a vehicle controller 104 or at a command-and-control location (e.g., a data center). In some embodiments, the acceleration profiles may be loaded onto the uncrewed vehicle from a computing device (e.g., a laptop computer, an electronic tablet, a smartphone, etc.).

In some embodiments, the acceleration profiles may be generated based on the vehicle parameters, as described above. For example, acceleration profile subsystem 114 may generate an acceleration profile for the uncrewed vehicle. In particular, acceleration profile subsystem 114 may generate, based on vehicle parameters associated with the uncrewed vehicle, an acceleration profile for the uncrewed vehicle. The acceleration profile may include a first duration for accelerating the uncrewed vehicle and a second duration for refraining from accelerating the uncrewed vehicle. In some embodiments, the vehicle parameters may include a vehicle type and/or acceleration sensor type. For example, acceleration profile subsystem 114 may generate different acceleration profiles for aerial vehicles, land vehicles, water vehicles, and/or amphibious vehicles.

Navigation system 102 (e.g., using trajectory profile subsystem 116) may generate, based on the target location and the target mode, a trajectory profile for the target location. The trajectory profile may include a plurality of instances of one or more acceleration profiles of the plurality of acceleration profiles. To continue with the example above, the target mode may require that an uncrewed aerial vehicle obscure its point of origin upon completion of the mission. Accordingly, trajectory profile subsystem 116 may generate a trajectory profile that may include a number of acceleration profiles. In some embodiments, for travelling to the target location, trajectory profile subsystem 116 may select or generate one or more acceleration profiles. The acceleration profile selection or generation may be performed as described above. For example, trajectory profile subsystem 116 may select an acceleration profile that includes six seconds of time when one or more motors of an aerial vehicle are spun up and 3 seconds of time when the one or more motors of an aerial vehicle are stopped. Trajectory profile subsystem 116 may then determine how many of these instances are needed to travel to the target location.

In addition, trajectory profile subsystem 116 may then generate a portion of the trajectory profile for travelling back from the target location while obscuring the location from where the mission originated. Accordingly, trajectory profile subsystem 116 may select different acceleration profiles that would, for example, cause the uncrewed aerial vehicle to fly in an unpredictable pattern. For example, one of the acceleration profiles that trajectory profile subsystem 116 may select may be a profile that would have a long motor engage time followed by a long motor disengage time, which, for an aerial vehicle, may cause the aerial vehicle to speed up quickly and then slow down over a long period of time. In addition, such an acceleration profile may cause an aerial vehicle to rise quickly and then fall for a long period of time. This type of an acceleration profile may follow by a different acceleration profile with a shorter time of acceleration and also a shorter time for deceleration. In some embodiments, these acceleration profile selections may be accompanied by changes of direction, so it is more difficult to track the vehicle to its point of origin.

This may be useful in another target mode that may be specified by the operator or that may be selected by default if another target mode is not selected. For example, different acceleration profiles may follow each other within the trajectory profile to make it difficult to track the uncrewed vehicle in order to capture, shoot down or otherwise destroy the vehicle (destruction avoidance). That is, trajectory profile subsystem 116 may select a particular number of acceleration profiles (e.g., two, three, four, etc.) with differing acceleration/deceleration values and iterate them within the trajectory profile. In one instance, trajectory profile subsystem 116 may select an acceleration profile with six seconds of acceleration and two seconds of deceleration may be followed by an acceleration profile with three seconds acceleration and three seconds deceleration. In some embodiments, these two acceleration profiles may be followed by another acceleration profile. Thus, if a bad actor is attempting to shoot down the vehicle with a kinetic weapon, it would be difficult to follow the trajectory of the vehicle as that trajectory will be changing constantly based on different acceleration profiles being used.

As discussed above, acceleration profile subsystem 114 may select or generate one or more acceleration profiles. In some embodiments, each acceleration profile may include a corresponding first duration (e.g., an amount of time that the motors are being engaged) determined based on vehicle parameters of the uncrewed vehicle. In some embodiments, the vehicle parameters may include at least one of vehicle type or an acceleration sensor type. Each acceleration profile may also include a second duration (e.g., indicating an amount of time the motors are not being engaged). In some embodiments, the vehicle type may include data and the type of vehicle (e.g., ground, aerial, water, underwater, etc.) and other vehicle data (e.g., types and number of motors, speed of the motors (e.g., rotations per minute)). In another example, if the vehicle is a ground vehicle with an engine, vehicle data may include the type of engine and other engine data, as described above in relation to FIG. 2.

In some embodiments, navigation system 102 may include a number of predetermined modes that may be selected (e.g., by an operator). For example, the operator may select a mode using vehicle controller 104. When a mode is selected, navigation system 102 may configure the trajectory based on the selected mode. For example, navigation system 102 (e.g., using trajectory profile subsystem 116) may determine that the target mode indicates a request for obscure pathing. That is, the mission parameters may call for obscuring a path of a vehicle (e.g., an uncrewed aerial vehicle).

Based on the target mode, trajectory profile subsystem 116 may generate a plurality of waypoints to the target location. Each waypoint of the plurality of waypoints may be closer to the target location than a previous waypoint. For example, trajectory profile subsystem 116 may take as input a target location and the origin. The input may include GPS coordinates for the target location and the origin. Based on those locations, trajectory profile subsystem 116 may generate a number of waypoints that, for example, do not lead directly to the target location, but bring the vehicle closer to the target location as each waypoint is reached. In some embodiments, trajectory profile subsystem 116 may use landmarks in generating the waypoints. For example, trajectory profile subsystem 116 may take as input a map that includes both the target location and the origin and identify any landmarks on that map. The landmarks may be buildings, mountains, forests, etc. Trajectory profile subsystem 116 may then select certain landmarks as waypoints. Selecting landmarks as waypoints may further obscure the vehicle's path to the target location.

Navigation system 102 (e.g., via trajectory profile subsystem 116) may then generate a plurality of portions of the trajectory profile for travelling to the target location through the plurality of waypoints. Each portion of the plurality of portions of the trajectory profile may include a set of instances of the one or more acceleration profiles. For example, trajectory profile subsystem 116 may generate a portion of the trajectory profile from the origin to the first waypoint using a first acceleration profile. That acceleration profile may be generated or selected based on the parameters of the uncrewed vehicle, as described above. Trajectory profile subsystem 116 may then generate a second portion of the trajectory profile from the first waypoint to a second waypoint. For the second portion, trajectory profile subsystem 116 may use a different acceleration profile that may further obscure the path to the target location. Trajectory profile subsystem 116 may continue generating trajectory profile portions for travelling to each point and then ultimately to the target location.

In some embodiments, the target mode may require obscuring the target location itself. Accordingly, trajectory profile subsystem 116 may identify other locations and mix the target location within those other locations to which the vehicle will travel. In particular, trajectory profile subsystem 116 may determine that the target mode includes a request to obscure the target location. For example, the target mode may be received from vehicle controller 104. In some embodiments, the target mode may be received from a satellite of satellites **108*a*-108*n* or from another device connected to network 150**.

Trajectory profile subsystem 116 may then generate a plurality of waypoints, wherein each waypoint of the plurality of waypoints is within a range of the target location. For example, trajectory profile subsystem 116 may receive the target location (e.g., GPS coordinates representing a target location) and may generate a plurality of waypoints within range of the target location. In some embodiments, the range me be predetermined based on the mission parameters. For example, the mission parameters may indicate that a target location is a cluster of buildings within a radius of a mile. The mission may indicate that an uncrewed aerial vehicle will travel to the target location and record images and video of the buildings within the one mile area before travelling back. Because the area involved is approximately one mile, the waypoints may be generated at least three to four miles from the target location. Accordingly, trajectory profile subsystem 116 may base the distance between waypoints on the dimensions of the target location. The dimensions of the target location may be received with the target location and the target mode.

In some embodiments, trajectory profile subsystem 116 may use landmarks as waypoints to further obscure the target location. For example, if the trajectory profile subsystem determines (e.g., using mission parameters) that there are landmarks with a predetermined range of the target location, trajectory profile subsystem 116 may select those landmarks as waypoints to further obscure the target location. Accordingly, trajectory profile subsystem 116 may take as input a map that includes a target location and determine, based on the map, a type of target location. Based on the type of target location, trajectory profile subsystem 116 may search the map for other locations with the same type and select those locations as waypoints.

Trajectory profile subsystem 116 may then add the target location to the plurality of waypoints. In some embodiments, trajectory profile subsystem 116 may randomize the order of waypoints that includes the target location. That way, the target location may be obscured. The target location may be the first visited, the last visited, or one of the locations in the middle. In some embodiments, trajectory profile subsystem 116 may determine a time required at the target location and generate a time for each location to be spent by the uncrewed vehicle. For example, trajectory profile subsystem 116 may determine, based on mission parameters, an amount of time required to perform the mission. If the mission is recording images, video, and/or audio of the target location, trajectory profile subsystem 116 may determine a time it takes to perform the mission. Based on the determination, trajectory profile subsystem 116 may determine a time to spend at each waypoint to further obscure the waypoint.

Trajectory profile subsystem 116 may then generate a plurality of portions of the trajectory profile. Each portion of the plurality of portions of the trajectory profile may include a set of instances of the one or more acceleration profiles for travelling to one of the plurality of waypoints. For example, trajectory profile subsystem 116 may determine the order of waypoints that include a target location and then generate a trajectory profile that includes travel to each waypoint including the target location.

In some embodiments, the target mode may call for a stealth approach. For example, a night mission may require that the uncrewed vehicle generate minimum amount of noise while travelling to the target location. Accordingly, navigation system 102 may adjust both the acceleration profile selection and trajectory profile generation based on that requirement. In particular, navigation system 102 may determine that the target mode includes a request for minimum noise. Trajectory profile subsystem 116 may receive an indication of the target mode and determine which available acceleration profile is associated with the least noise. This may be based on the thrust or power indicated within the acceleration profile. For example, for aerial vehicles, the higher the power or thrust, the higher the noise. Accordingly, trajectory profile subsystem 116 may select an acceleration profile that produces the least amount of noise.

In some embodiments, trajectory profile subsystem 116 may select several acceleration profiles. In particular, trajectory profile subsystem 116 may determine a set of acceleration profiles associated with minimal noise generation. For example, trajectory profile subsystem 116 may select a first profile with minimal noise generation for travelling in a predetermined range of the target location. However, some portions of the trajectory may not require minimal noise. Accordingly, trajectory profile subsystem 116 may select other acceleration profiles for those portions of the trajectory profile. For example, the mission may require minimal noise within a ten-mile radius of the target. However, it may be twenty miles to target. Accordingly, trajectory profile subsystem 116 may select an acceleration profile for the first portion of the journey based on other parameters (e.g., as described above) and select the acceleration profile generating minimal noise for the last ten-mile portion of the trajectory. In some embodiments, trajectory profile subsystem 116 may generate the trajectory profile based on the set of acceleration profiles associated with the minimal noise generation. For example, the mission parameters may require minimum noise generation for the full travel to the target location. Thus, a single acceleration profile may be used.

In some embodiments, special target modes may be selected for the uncrewed aerial vehicle. For example, an operator may use vehicle controller 104 to input a target mode for an uncrewed vehicle. The vehicle controller may include a number of options to select for a target mode. The vehicle controller may determine that the uncrewed vehicle is an uncrewed aerial vehicle, and based on that, add options for selection that are unique to the uncrewed aerial vehicle. For example, one option that may be added is a special trajectory mode that may indicate a trajectory to be used by the uncrewed vehicle to arrive at the location. For example, a target location may be a building with limited field of view (e.g., based on the location of the building, the building occupants may not be able to see objects that are high in the sky or low near the ground). Accordingly, an operator may input a particular trajectory as the target mode.

When navigation system 102 receives the target mode, navigation system 102 may determine that the target mode includes a request for a pre-determined aerial trajectory. In some embodiments, the aerial trajectory may indicate the uncrewed aerial vehicle should take a particular trajectory when travelling to the target location. For example, a pre-determined trajectory may be a trajectory that takes an aerial vehicle as high as possible before dropping down to the target location. Thus, trajectory profile subsystem 116 may determine a set of acceleration profiles for achieving the pre-determined aerial trajectory. The set of acceleration profiles may include one or more profiles. In some embodiments, there may be a first acceleration profile that takes the uncrewed aerial vehicle to a pre-determined height while also moving the vehicle horizontally and then a second acceleration profile that may cause the uncrewed aerial vehicle to descend onto the target location, thereby creating a desired trajectory.

Accordingly, trajectory profile subsystem 116 may generate the trajectory profile based on the set of acceleration profiles for achieving the pre-determined aerial trajectory.

As discussed above, trajectory profile subsystem 116 may select one or more trajectory profiles for achieving the desired trajectory. For example, each acceleration profile may be stored with a particular set of parameters indicating how high and how far an uncrewed vehicle will travel after executing a single instance of the acceleration profile. Thus, trajectory profile subsystem 116 may use that information to identify a combination of acceleration profiles needed to generate a desired trajectory. For example, trajectory profile subsystem 116 may break up the trajectory into smaller pieces and may match an acceleration profile to each piece or portion of the trajectory. In particular, trajectory profile subsystem 116 may select a first portion of the trajectory that calls for the uncrewed aerial vehicle to travel five feet vertically and three feet horizontally in a particular direction. Accordingly, trajectory profile subsystem 116 may identify or generate an acceleration profile to fit that trajectory. Trajectory profile subsystem 116 may use vehicle parameters to perform the determination. For example, a particular thrust of one or more motors may cause the uncrewed aerial vehicle to travel a particular distance horizontally and a particular distance vertically. Accordingly, trajectory profile subsystem 116 may select that acceleration profile or generate such acceleration profile using those parameters.

When the trajectory profile has been generated, it may be executed. In some embodiments, pathing subsystem 118 may determine, while executing the trajectory profile after each instance of the one or more acceleration profiles, a corresponding vehicle location of the uncrewed vehicle. For example, pathing subsystem 118 may use an accelerometer to determine acceleration values over time during each execution of the acceleration profile and use double integration of acceleration over time to determine distance of travel. Pathing subsystem 118 may continue the calculations when the uncrewed vehicle is traveling to determine the location of the uncrewed vehicle after each instance of acceleration profile is executed.

As discussed above, if pathing subsystem 118 determines that the uncrewed vehicle is not moving according to estimates, pathing subsystem 118 may adjust the trajectory profile (e.g., as described above). In particular, pathing subsystem 118 may adjust the trajectory profile based on the corresponding vehicle location. For example, if the uncrewed vehicle is being blown off course because of wind, pathing subsystem 118 may adjust the direction and/or number of acceleration profiles needed to travel to the target location. Thus, based on determining that the plurality of instances of the one or more acceleration profiles have been executed, pathing subsystem 118 may terminate execution of the trajectory profile.

As discussed above, each trajectory profile may include a direction of travel which may be adjusted. In particular, the trajectory profile may include, for each instance of the plurality of instances of the one or more acceleration profiles of the plurality of acceleration profiles, a direction of travel. The direction of travel is adjusted during execution of the trajectory profile. For example, FIG. 3 illustrates a field within a data structure storing the trajectory profile in field 309 that includes a direction of travel.

In some embodiments, pathing subsystem 118 may not monitor progress of the uncrewed vehicle as the trajectory profile is executed. That is, pathing subsystem 118 may just cause the trajectory profile to be executed on the uncrewed vehicle. In such embodiments, pathing subsystem 118 may determine a location of the uncrewed vehicle after the trajectory profile has been executed. For example, pathing subsystem 118 may use a global positioning system to determine vehicle location and may generate another trajectory profile to get to the target location. In some embodiments, pathing subsystem 118 may use a network link to an operator or to a command-and-control center to ascertain its location.

Computing Environment

Figure 5:
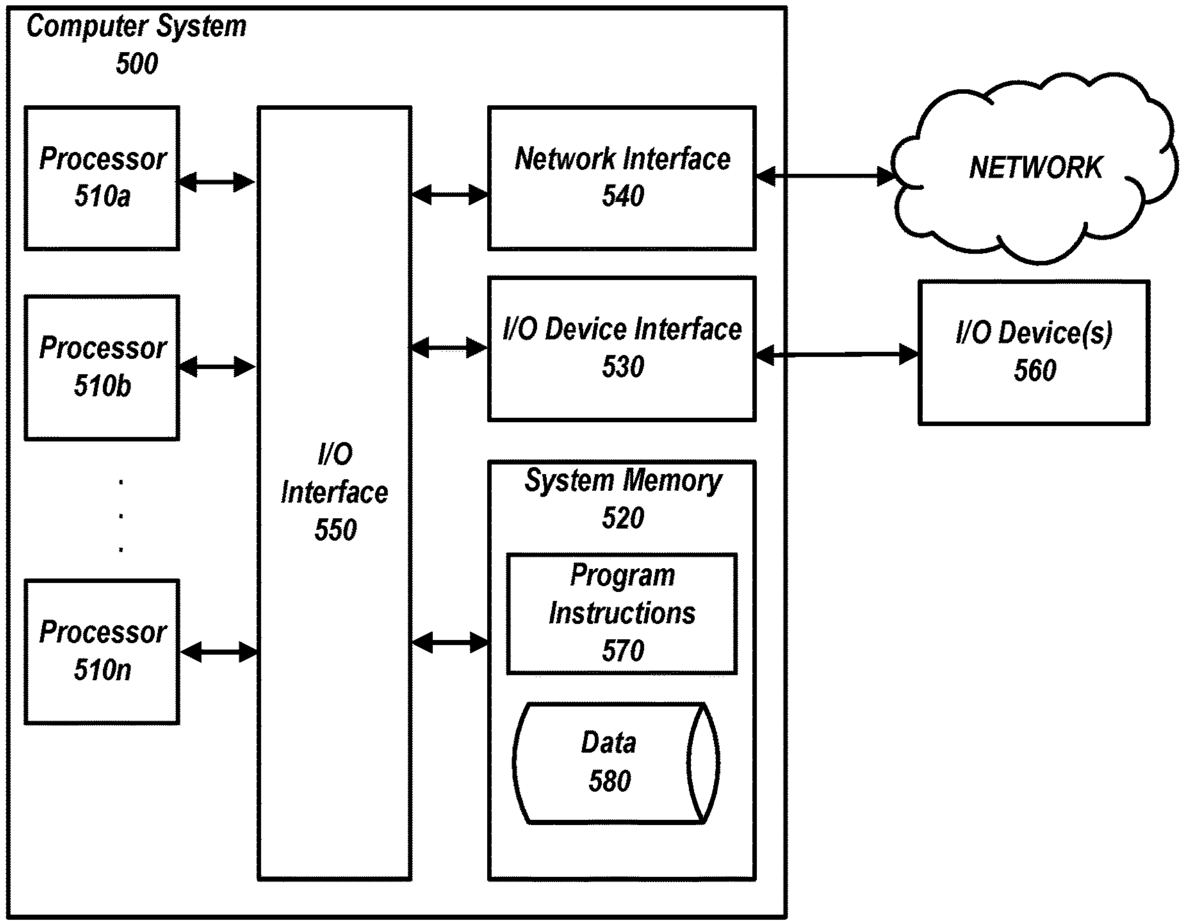
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. The computing system may be hosted on a device (e.g., a smartphone, a tablet, or another suitable device) that an operator may control. In some embodiments, the computing system may be hosted on a server at a datacenter. Alternatively or additionally, the computing system may be built into an uncrewed vehicle. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510*a*), or a multiprocessor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a local area network (LAN), a wide area network (WAN), a cellular communications network, or the like.

System memory 520 may be configured to store program instructions 570 or data 580. Program instructions 570 may be executable by a processor (e.g., one or more of processors 510*a*-510*n*) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 6:
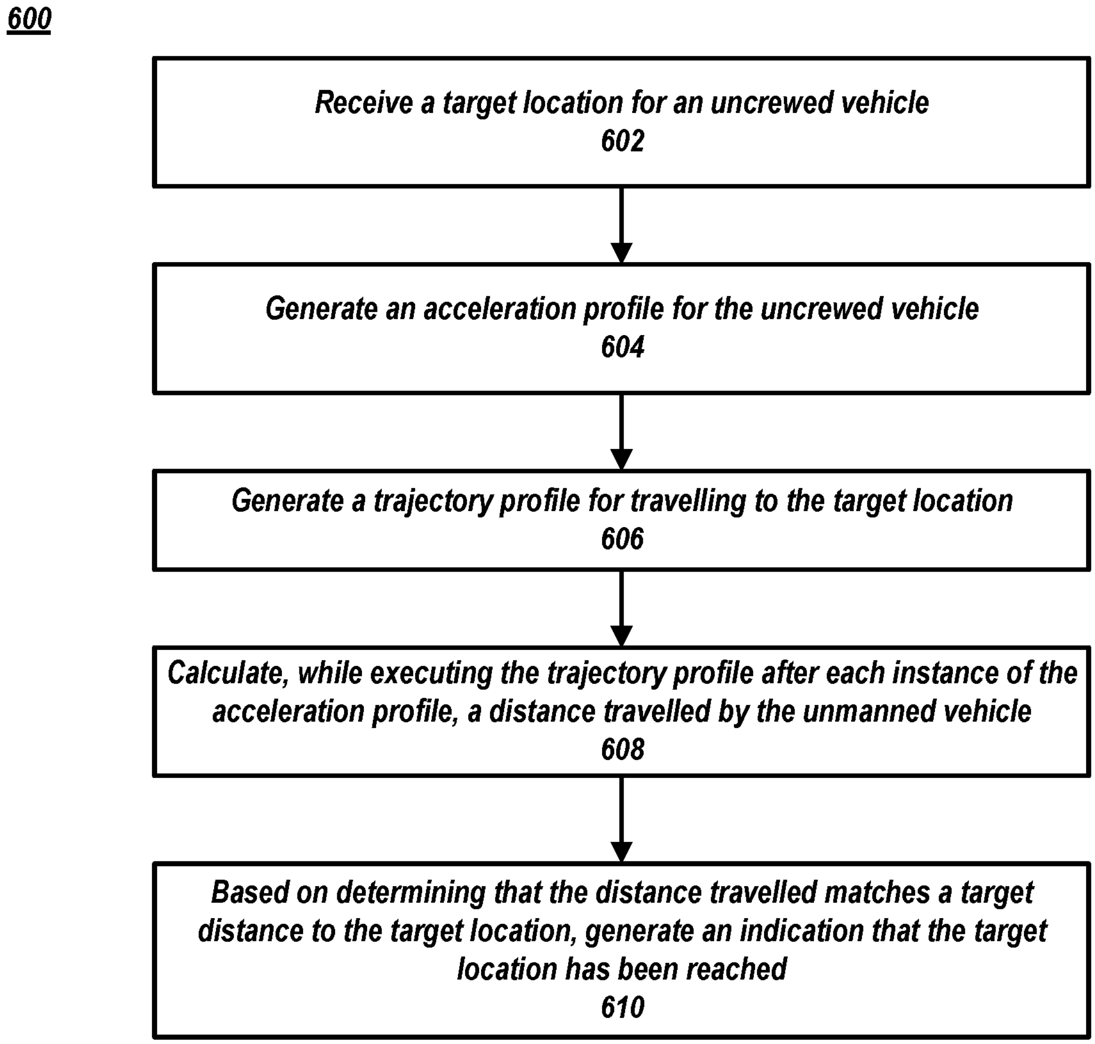
FIG. 6 is a flowchart of operations for navigating vehicles using acceleration profiles, in accordance with one or more embodiments of this disclosure.

FIG. 6 is a flowchart 600 of operations for generating acceleration profiles. The operations of FIG. 6 may use components described in relation to FIG. 5. In some embodiments, navigation system 102 may include one or more components of computing system 500. At 602, navigation system 102 receives a target location for an uncrewed vehicle. For example, the navigation system may receive the target location from vehicle controller 104, over network 150 using network interface 540. In some embodiments, navigation system 102 may receive the target location from one of satellites 108*a*-108*n* using a satellite communication device.

At 604, navigation system 102 generates an acceleration profile for the uncrewed vehicle. For example, navigation system 102 may use one or more processors 510*a*, 510*b*, and/or 510*n* to generate the acceleration profile. In some embodiments, navigation system 102 may generate the acceleration profile onboard an uncrewed vehicle, at a vehicle controller (e.g., vehicle controller 104) or at a command-and-control location. At 606, navigation system 102 generates a trajectory profile for travelling to the target location. For example, navigation system 102 may use one or more processors 510*a*, 510*b*, and/or 510*n* to generate the trajectory profile. In some embodiments, navigation system 102 may generate the trajectory profile onboard an uncrewed vehicle, at a vehicle controller (e.g., vehicle controller 104) or at a command-and-control location.

At 608, navigation system 102 calculates, while executing the trajectory profile after each instance of the acceleration profile, a distance travelled by the uncrewed vehicle. Navigation system 102 may perform this operation using one or more processors 510*a*, 510*b*, and/or 510*n*. At 610, navigation system 102, based on determining that the distance travelled matches a target distance to the target location, generates an indication that the target location has been reached. Navigation system 102 may use one or more processors 510*a*, 510*b*, and/or 510*n* and/or system memory 520 to perform this operation.

Figure 7:
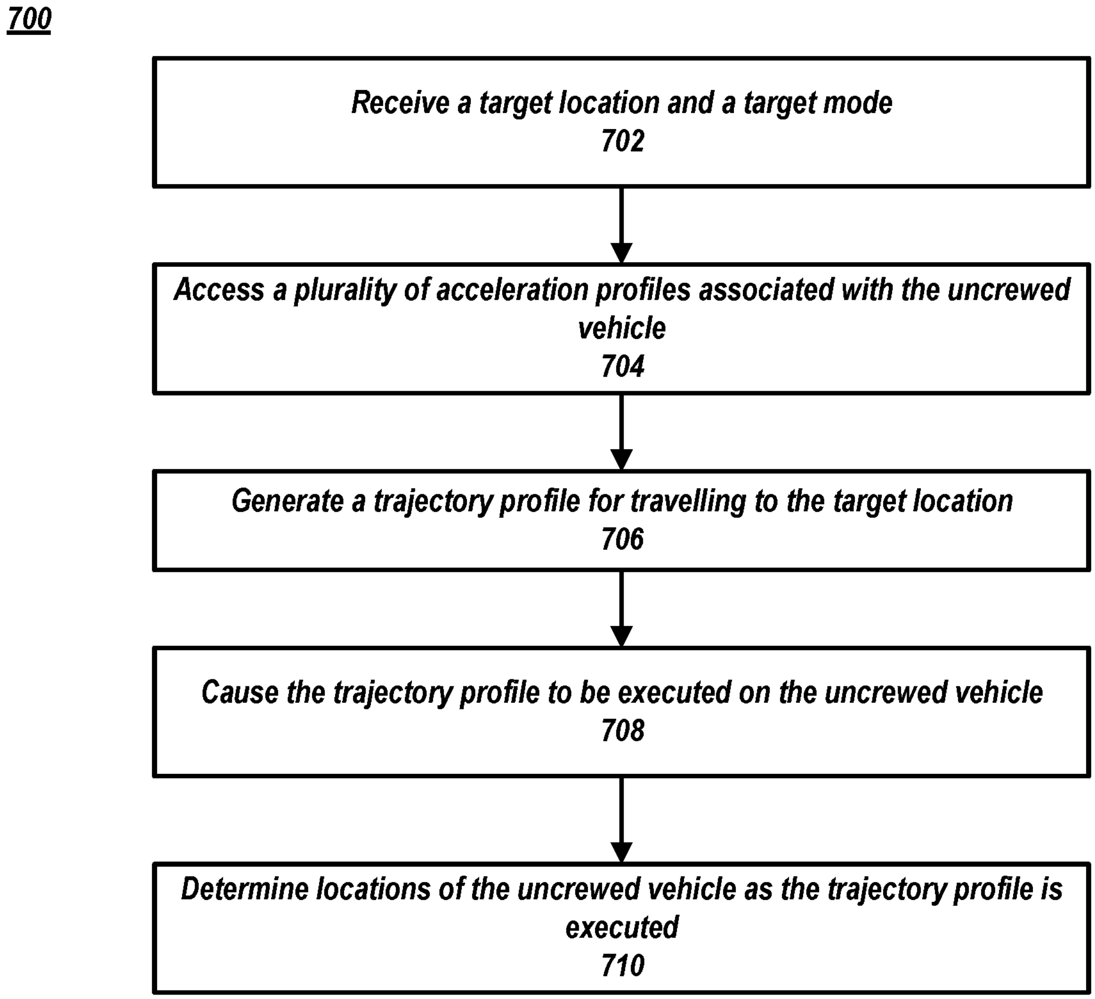
FIG. 7 is another flowchart of operations for navigating vehicles using acceleration profiles, in accordance with one or more embodiments of this disclosure.

FIG. 7 is a flowchart 700 of operations for generating and using trajectory profiles. The operations of FIG. 7 may use components described in relation to FIG. 5. In some embodiments, navigation system 102 may include one or more components of computing system 500. At 702, navigation system 102 receives a target location and a target mode. For example, the navigation system may receive the target location and the target mode from vehicle controller 104, over network 150 using network interface 540. In some embodiments, navigation system 102 may receive the target location and the target mode from one of satellites 108*a*-108*n* using a satellite communication device.

At 704, navigation system 102 accesses a plurality of acceleration profiles associated with the uncrewed vehicle. For example, navigation system 102 may use one or more processors 510*a*, 510*b*, and/or 510*n* to access the acceleration profiles. In some embodiments, navigation system 102 may access the acceleration profiles onboard an uncrewed vehicle, at a vehicle controller (e.g., vehicle controller 104) or at a command-and-control location. At 706, navigation system 102 generates a trajectory profile for travelling to the target locations. For example, navigation system 102 may use one or more processors 510*a*, 510*b*, and/or 510*n* to generate the trajectory profile. In some embodiments, navigation system 102 may generate the trajectory profile onboard an uncrewed vehicle, at a vehicle controller (e.g., vehicle controller 104) or at a command-and-control location.

At 708, navigation system 102 causes the trajectory profile to be executed on the uncrewed vehicle. Navigation system 102 may perform this operation using one or more processors 510*a*, 510*b*, and/or 510*n*. At 710, navigation system 102 determines locations of the uncrewed vehicle as the trajectory profile is executed. Navigation system 102 may use one or more processors 510*a*, 510*b*, and/or 510*n* and/or system memory 520 to perform this operation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for generating acceleration profiles will be better understood with reference to the following enumerated embodiments:

1. A method comprising: receiving a target location for an uncrewed vehicle; generating, based on vehicle parameters associated with the uncrewed vehicle, an acceleration profile for the uncrewed vehicle, wherein the acceleration profile comprises a first duration for accelerating the uncrewed vehicle and a second duration for refraining from accelerating the uncrewed vehicle; generating, based on the target location and the acceleration profile, a trajectory profile for travelling to the target location, wherein the trajectory profile comprises a plurality of instances of the acceleration profile; calculating, while executing the trajectory profile after each instance of the acceleration profile, a distance travelled by the uncrewed vehicle; and based on determining that the distance travelled matches a target distance to the target location, generating an indication that the target location has been reached.
2. Any of the preceding embodiments, wherein generating the acceleration profile for the uncrewed vehicle comprises: detecting a vehicle type associated with the uncrewed vehicle; determining, based on the vehicle type, a maximum thrust associated with the uncrewed vehicle; and determining the first duration based on the maximum thrust associated with the uncrewed vehicle, wherein an acceleration value is set below the maximum thrust.
3. Any of the preceding embodiments, wherein generating the acceleration profile for the uncrewed vehicle further comprises: detecting an acceleration sensor type associated with a sensor onboard the uncrewed vehicle that measures acceleration of the uncrewed vehicle; determining, based on the acceleration sensor type, a minimum detectable acceleration; and determining the acceleration profile based on the minimum detectable acceleration, wherein an acceleration value is set above the minimum detectable acceleration.
4. Any of the preceding embodiments, wherein the acceleration profile comprises: a first instruction to engage one or more motors associated with the uncrewed vehicle and an amount of power to be applied to the one or more motors; and a second instruction to disengage the one or more motors after a time period for engaging the one or more motors has passed.
5. Any of the preceding embodiments, wherein calculating the distance travelled by the uncrewed vehicle comprises: determining a direction associated with a first acceleration, wherein the first acceleration is associated with a first instance of the plurality of instances of the acceleration profile; and adjusting a second instance of the acceleration profile based on the direction associated with the first acceleration.
6. Any of the proceeding embodiments, wherein calculating the distance travelled by the uncrewed vehicle comprises: determining a first distance travelled after a first acceleration, wherein the first acceleration is associated with a first instance of the plurality of instances of the acceleration profile; and adjusting the trajectory profile based on the first distance travelled after the first acceleration.
7. Any of the preceding embodiments, further comprising: determining, based on a vehicle type of the uncrewed vehicle, that the uncrewed vehicle is an aerial vehicle; and based on determining that the uncrewed vehicle is the aerial vehicle, adjusting the acceleration profile to prevent the uncrewed vehicle from contacting terrain.
8. A tangible, non-transitory, machine-readable medium storing instructions that, when executed by a data processing apparatus, cause the data processing apparatus to perform operations comprising those of any of embodiments 1-7.
9. A system comprising: one or more processors; and memory storing instructions that, when executed by the processors, cause the processors to effectuate operations comprising those of any of embodiments 1-7.
10. A system comprising means for performing any of embodiments 1-7.
11. A system comprising cloud-based circuitry for performing any of embodiments 1-7.

The present techniques for generating trajectory profiles will be better understood with reference to the following enumerated embodiments:

1. A method comprising: receiving, for an uncrewed vehicle, a target location and a target mode, wherein the target mode indicates a type of activity for the uncrewed vehicle; accessing a plurality of acceleration profiles associated with the uncrewed vehicle, wherein each acceleration profile of the plurality of acceleration profiles comprises a corresponding first duration for accelerating the uncrewed vehicle and a corresponding second duration for not accelerating the uncrewed vehicle; generating, based on the target location and the target mode, a trajectory profile for the target location, wherein the trajectory profile comprises a plurality of instances of one or more acceleration profiles of the plurality of acceleration profiles; causing the trajectory profile to be executed on the uncrewed vehicle; and determining locations of the uncrewed vehicle as the trajectory profile is executed.
2. Any of the proceeding embodiments, further comprising generating the plurality of acceleration profiles, wherein each acceleration profile of the plurality of acceleration profiles comprises the corresponding first duration determined based on vehicle parameters of the uncrewed vehicle, the vehicle parameters comprising at least one of vehicle type or an acceleration sensor type.
3. Any of the proceeding embodiments, wherein generating the trajectory profile for travelling to the target location further comprises: determining that the target mode comprises a request to obscure pathing; generating a plurality of waypoints to the target location, wherein each waypoint of the plurality of waypoints is closer to the target location than a previous waypoint; and generating a plurality of portions of the trajectory profile for travelling to the target location through the plurality of waypoints, wherein each portion of the plurality of portions of the trajectory profile comprises a set of instances of the one or more acceleration profiles.
4. Any of the proceeding embodiments, wherein generating the trajectory profile for travelling to the target location further comprises: determining that the target mode comprises a request to obscure the target location; generating a plurality of waypoints, wherein each waypoint of the plurality of waypoints is within a range of the target location; adding the target location to the plurality of waypoints; and generating a plurality of portions of the trajectory profile, wherein each portion of the plurality of portions of the trajectory profile comprises a set of instances of the one or more acceleration profiles for travelling to one of the plurality of waypoints.

5. Any of the proceeding embodiments, wherein generating the trajectory profile for travelling to the target location further comprises: determining that the target mode comprises a request for minimum noise; determining a set of acceleration profiles associated with minimal noise generation; and generating the trajectory profile based on the set of acceleration profiles associated with the minimal noise generation.

6. Any of the proceeding embodiments, wherein generating the trajectory profile for travelling to the target location further comprises: determining that the target mode comprises a request for a pre-determined aerial trajectory; determining a set of acceleration profiles for achieving the pre-determined aerial trajectory; and generating the trajectory profile based on the set of acceleration profiles for achieving the pre-determined aerial trajectory.

7. Any of the proceeding embodiments, wherein the trajectory profile comprises, for each instance of the plurality of instances of the one or more acceleration profiles of the plurality of acceleration profiles, a direction of travel, and wherein the direction of travel is adjusted during execution of the trajectory profile.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

What is claimed is:

1. A system for navigating uncrewed vehicles, the system comprising:

one or more processors; and one or more non-transitory, computer-readable storage media storing instructions, which when executed by the one or more processors cause the one or more processors to perform operations comprising:

receiving a target location for an uncrewed vehicle;

generating, based on vehicle parameters associated with the uncrewed vehicle, an acceleration profile for the uncrewed vehicle, wherein the acceleration profile comprises a first duration of time for accelerating the uncrewed vehicle by turning on an engine and a second duration of time for refraining from accelerating the uncrewed vehicle by turning off the engine, and wherein the vehicle parameters comprise at least one of vehicle type or an acceleration sensor type;

determining, based on the target location, a target distance to the target location;

generating, based on the target distance and the acceleration profile, a trajectory profile for travelling to the target location, wherein the trajectory profile comprises a plurality of instances of the acceleration profile;

adjusting movement of the uncrewed vehicle using the trajectory profile;

calculating, using an onboard device, while executing the trajectory profile after each instance of the acceleration profile, a distance travelled by the uncrewed vehicle; and based on determining that the distance travelled matches the target distance, generating an indication that the target location has been reached.

2. The system of claim 1, wherein the instructions for generating, the acceleration profile for the uncrewed vehicle further cause the one or more processors to perform operations comprising:

detecting the vehicle type;

determining, based on the vehicle type, a maximum thrust associated with the uncrewed vehicle; and determining the first duration based on the maximum thrust associated with the uncrewed vehicle, wherein an acceleration value is set below the maximum thrust.

3. The system of claim 1, wherein the instructions further cause the one or more processors to perform operations comprising:

detecting the acceleration sensor type;

determining, based on the acceleration sensor type, a minimum detectable acceleration; and determining the acceleration profile based on the minimum detectable acceleration, wherein an acceleration value is set above the minimum detectable acceleration.

4. The system of claim 1, wherein the acceleration profile comprises:

a first instruction to engage one or more motors associated with the uncrewed vehicle and an amount of power to be applied to the one or more motors; and a second instruction to disengage the one or more motors after a time period for engaging the one or more motors has passed.

5. The system of claim 1, wherein the instructions for calculating the distance travelled by the uncrewed vehicle cause the one or more processors to perform operations comprising:

determining a direction associated with a first acceleration, wherein the first acceleration is associated with a first instance of the plurality of instances of the acceleration profile; and adjusting a second instance of the acceleration profile based on the direction associated with the first acceleration.

6. The system of claim 1, wherein the instructions for calculating the distance travelled by the uncrewed vehicle cause the one or more processors to perform operations comprising:

determining a first distance travelled after a first acceleration, wherein the first acceleration is associated with a first instance of the plurality of instances of the acceleration profile; and adjusting the trajectory profile based on the first distance travelled after the first acceleration.

7. The system of claim 1, wherein the instructions further cause the one or more processors to perform operations comprising:

determining, based on the vehicle type, that the uncrewed vehicle is an aerial vehicle; and based on determining that the uncrewed vehicle is the aerial vehicle, adjusting the acceleration profile to prevent the uncrewed vehicle from contacting terrain.

8. A method comprising:

receiving a target location for an uncrewed vehicle;

generating, based on vehicle parameters associated with the uncrewed vehicle, an acceleration profile for the uncrewed vehicle, wherein the acceleration profile comprises a first duration of time for accelerating the uncrewed vehicle by turning on an engine and a second duration of time for refraining from accelerating the uncrewed vehicle by turning off the engine;

generating, based on the target location and the acceleration profile, a trajectory profile for travelling to the target location, wherein the trajectory profile comprises a plurality of instances of the acceleration profile;

adjusting movement of the uncrewed vehicle using the trajectory profile;

calculating, while executing the trajectory profile after each instance of the acceleration profile, a distance travelled by the uncrewed vehicle; and based on determining that the distance travelled matches a target distance to the target location, generating an indication that the target location has been reached.

9. The method of claim 8, wherein generating the acceleration profile for the uncrewed vehicle comprises:

detecting a vehicle type associated with the uncrewed vehicle;

determining, based on the vehicle type, a maximum thrust associated with the uncrewed vehicle; and determining the first duration based on the maximum thrust associated with the uncrewed vehicle, wherein an acceleration value is set below the maximum thrust.

10. The method of claim 8, wherein generating the acceleration profile for the uncrewed vehicle further comprises:

detecting an acceleration sensor type associated with a sensor onboard the uncrewed vehicle that measures acceleration of the uncrewed vehicle;

determining, based on the acceleration sensor type, a minimum detectable acceleration; and determining the acceleration profile based on the minimum detectable acceleration, wherein an acceleration value is set above the minimum detectable acceleration.

11. The method of claim 8, wherein the acceleration profile comprises:

a first instruction to engage one or more motors associated with the uncrewed vehicle and an amount of power to be applied to the one or more motors; and a second instruction to disengage the one or more motors after a time period for engaging the one or more motors has passed.

12. The method of claim 8, wherein calculating the distance travelled by the uncrewed vehicle comprises:

determining a direction associated with a first acceleration, wherein the first acceleration is associated with a first instance of the plurality of instances of the acceleration profile; and adjusting a second instance of the acceleration profile based on the direction associated with the first acceleration.

13. The method of claim 8, wherein calculating the distance travelled by the uncrewed vehicle comprises:

determining a first distance travelled after a first acceleration, wherein the first acceleration is associated with a first instance of the plurality of instances of the acceleration profile; and adjusting the trajectory profile based on the first distance travelled after the first acceleration.

14. The method of claim 8, further comprising:

determining, based on a vehicle type of the uncrewed vehicle, that the uncrewed vehicle is an aerial vehicle; and based on determining that the uncrewed vehicle is the aerial vehicle, adjusting the acceleration profile to prevent the uncrewed vehicle from contacting terrain.

15. One or more non-transitory, computer-readable media storing instructions thereon, wherein the instructions cause one or more processors to perform operations comprising:

receiving a target location for an uncrewed vehicle;

generating, based on vehicle parameters associated with the uncrewed vehicle, an acceleration profile for the uncrewed vehicle, wherein the acceleration profile comprises a first duration of time for accelerating the uncrewed vehicle by turning on an engine and a second duration of time for refraining from accelerating the uncrewed vehicle by turning off the engine;

determining, based on the target location and a current location, a target distance to the target location;

generating, based on the target distance and the acceleration profile, a trajectory profile for travelling to the target location, wherein the trajectory profile comprises a plurality of instances of the acceleration profile;

calculating, while executing the trajectory profile after each instance of the acceleration profile, a distance travelled by the uncrewed vehicle; and adjusting uncrewed vehicle movement based on the distance travelled.

16. The one or more non-transitory, computer-readable media of claim 15, wherein the instructions for generating the acceleration profile for the uncrewed vehicle further cause the one or more processors to perform operations comprising:

detecting a vehicle type associated with the uncrewed vehicle;

determining, based on the vehicle type, a maximum thrust associated with the uncrewed vehicle; and determining the first duration based on the maximum thrust associated with the uncrewed vehicle, wherein an acceleration value is set below the maximum thrust.

17. The one or more non-transitory, computer-readable media of claim 15, wherein the instructions for generating the acceleration profile for the uncrewed vehicle further cause the one or more processors to perform operations comprising:

detecting an acceleration sensor type associated with a sensor onboard the uncrewed vehicle that measures acceleration of the uncrewed vehicle;

determining, based on the acceleration sensor type, a minimum detectable acceleration; and determining the acceleration profile based on the minimum detectable acceleration, wherein an acceleration value is set above the minimum detectable acceleration.

18. The one or more non-transitory, computer-readable media of claim 15, wherein the acceleration profile comprises:

a first instruction to engage one or more motors associated with the uncrewed vehicle and an amount of power to be applied to the one or more motors; and a second instruction to disengage the one or more motors after a time period for engaging the one or more motors has passed.

19. The one or more non-transitory, computer-readable media of claim 15, wherein the instructions for calculating the distance travelled by the uncrewed vehicle further cause the one or more processors to perform operations comprising:

determining a direction associated with a first acceleration, wherein the first acceleration is associated with a first instance of the plurality of instances of the acceleration profile; and adjusting a second instance of the acceleration profile based on the direction associated with the first acceleration.

20. The one or more non-transitory, computer-readable media of claim 15, wherein the instructions for calculating the distance travelled by the uncrewed vehicle further cause the one or more processors to perform operations comprising:

determining a first distance travelled after a first acceleration, wherein the first acceleration is associated with a first instance of the plurality of instances of the acceleration profile; and adjusting the trajectory profile based on the first distance travelled after the first acceleration.

* * * * *